United States Patent [19]

Aiba

[11] Patent Number: 5,977,491

[45] Date of Patent: Nov. 2, 1999

[54] TABLET DEVICE FOR USE WITH AN ELECTRONIC INPUT COORDINATE SYSTEM

[75] Inventor: Hiroshi Aiba, Tokyo, Japan

[73] Assignee: Kabushiki Kaisha Toshiba, Kawasaki, Japan

[21] Appl. No.: 08/814,510

[22] Filed: Mar. 10, 1997

[30] Foreign Application Priority Data

Mar. 19, 1996 [JP] Japan .................................... 8-063359

[51] Int. Cl.⁶ ..................................................... G08C 21/00

[52] U.S. Cl. ..................................... 178/18.01; 178/18.03

[58] Field of Search ..................................... 345/173, 174, 345/179; 178/18.01, 18.03, 18.05, 19.01, 19.03

[56] References Cited

U.S. PATENT DOCUMENTS

| | | | |
|---|---|---|---|
| 4,794,634 | 12/1988 | Torihata et al. | 345/173 |
| 5,072,076 | 12/1991 | Camp, Jr. | 178/18.01 |
| 5,159,159 | 10/1992 | Asher | 178/18.03 |
| 5,335,230 | 8/1994 | Crooks et al. | 365/174 |

*Primary Examiner*—Vijay Shankar
*Attorney, Agent, or Firm*—Finnegan, Henderson, Farabow, Garrett & Dunner, L.L.P.

[57] ABSTRACT

A coordinate input system using an electronic tablet with four electrodes and four lines connected to the four electrodes. The four lines diverge into eight lines, and the eight lines are connected to a connector. Four of the eight lines reflect the electrical potential on the four electrodes. These four lines are connected to an A/D converter. The remaining four lines supply a voltage to the four electrodes. This coordinate system detects initial electrical potential values with hardware.

1 Claim, 9 Drawing Sheets

TABLET DEVICE FOR USE WITH AN ELECTRONIC INPUT COORDINATE SYSTEM

BACKGROUND OF THE INVENTION

1. Field of the Invention

The present invention relates to a coordinate input system using a tablet provided for detecting an axial coordinate. The coordinate input system using the tablet was designed for a small personal computer, and can be carried with the computer.

2. Related Art

A coordinate input system using the tablet has an advantage in that it is able to combine a liquid crystal indication screen and a resistance membrane tablet in one body.

A resistance membrane tablet of the coordinate input system has a film side resistance membrane for the X coordinate input and a glass side resistance membrane for the Y coordinate input. The film side resistance membrane consists of transparent matter. An insulating material is sandwiched between the film side resistance membrane and the glass side resistance membrane. The insulating material breaks down under pressure.

When a stylus pen for indicating a coordinate touches the film side resistance membrane, the film side resistance membrane and the glass side resistance membrane contact. As a result, a resistance division occurs on both the transparent film side resistance membrane and the glass side resistance membrane. In this condition, electrodes on each resistance membrane detect the electrical potential of each resistance membrane.

The electrical potential detected by each electrode is converted into a digital signal by an A/D converter (analog-digital converter). CPU calculates the X coordinate and the Y coordinate from this digital signal.

Figure 6:
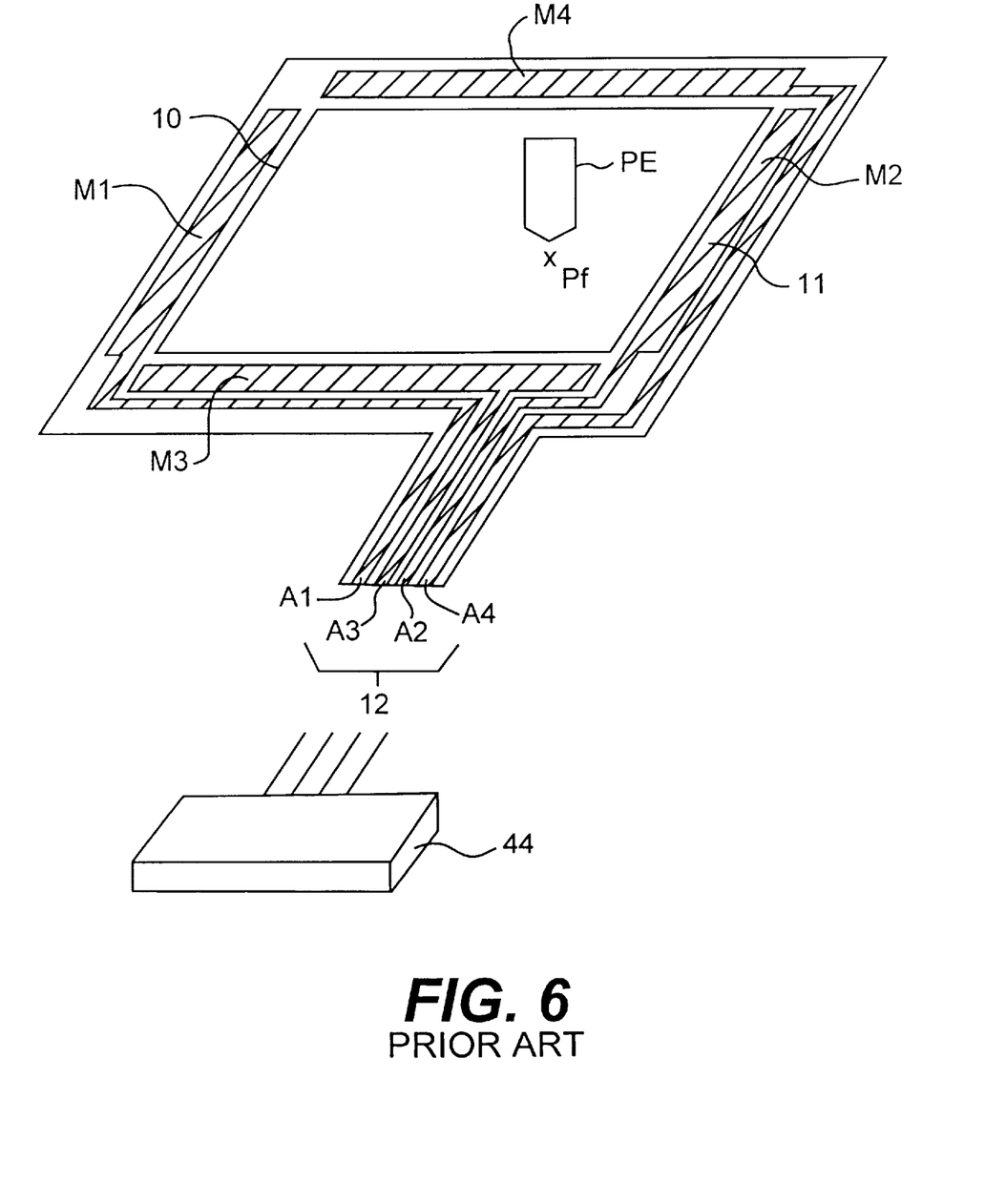
FIG. 6 shows an embodiment of a resistance membrane tablet of the coordinate input system with four electrodes.
Figure 7:
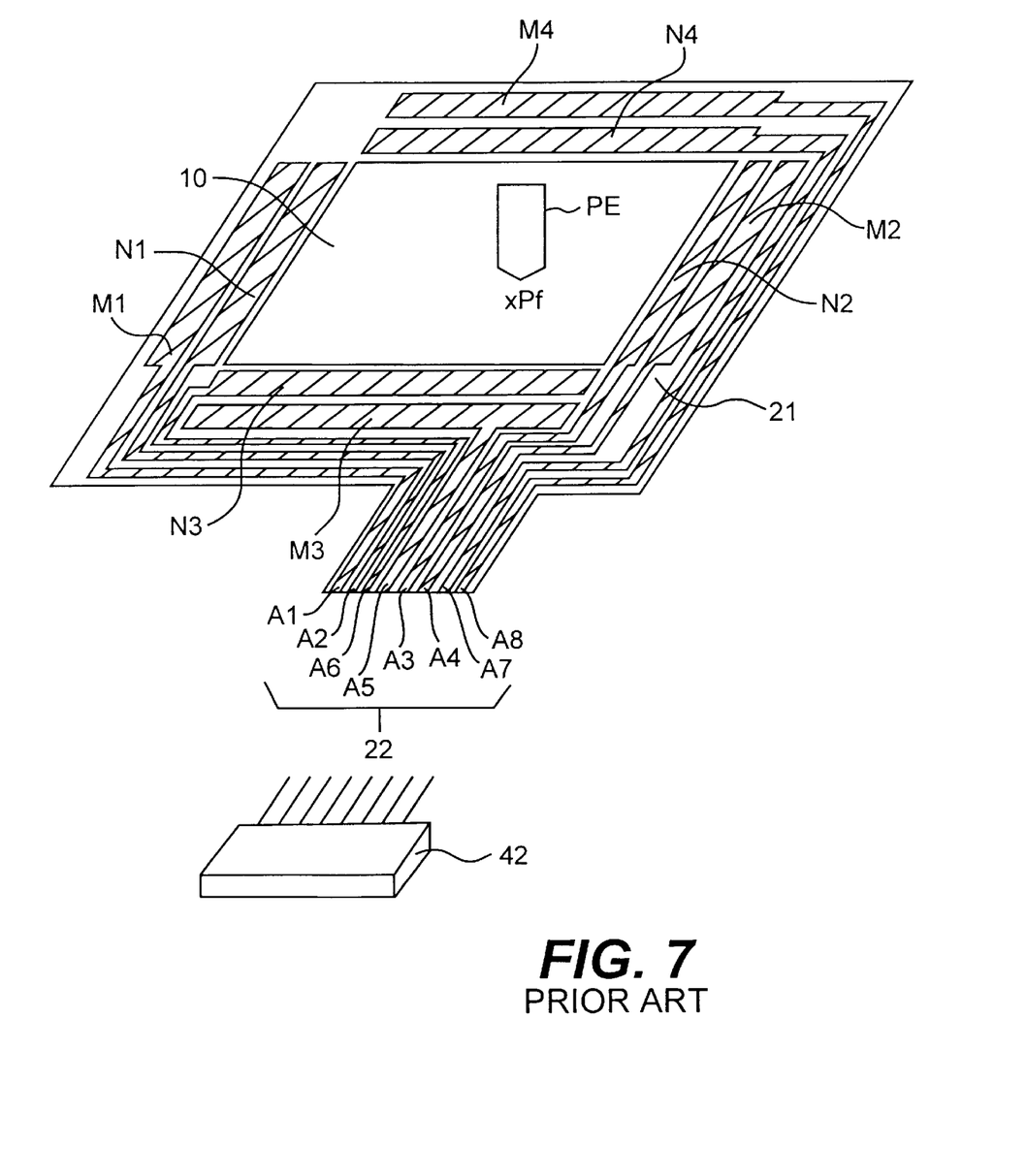
FIG. 7 shows an embodiment of a resistance membrane tablet of a coordinate input system with eight electrodes.
Figure 8:
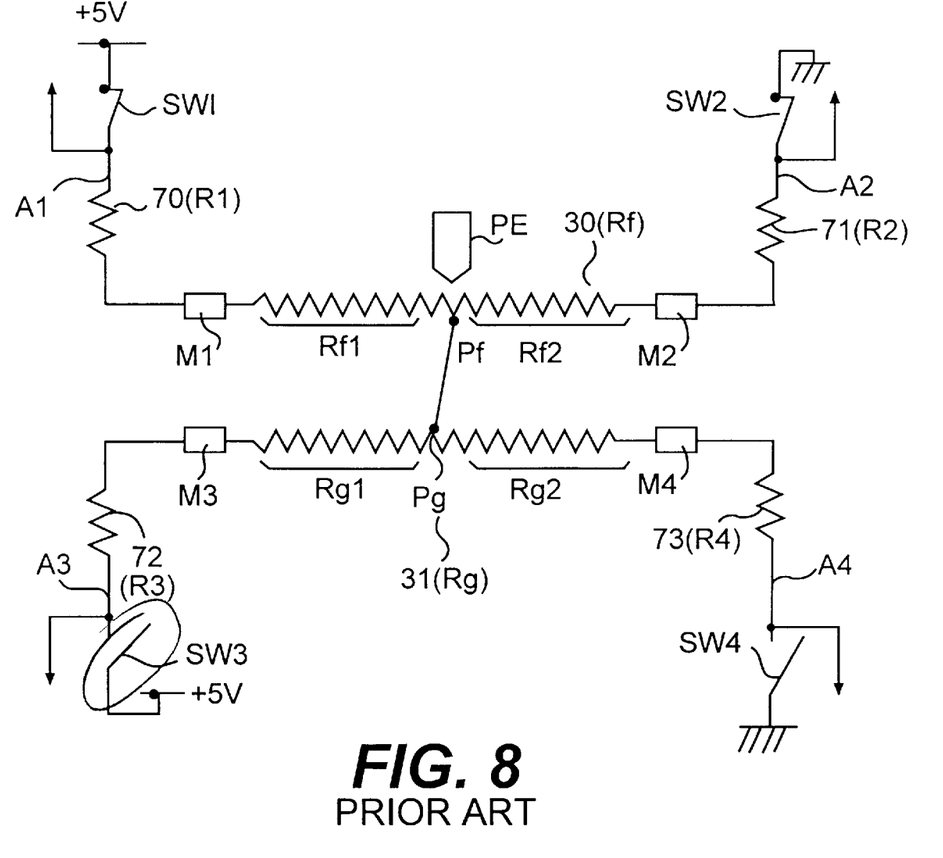
FIG. 8 shows an equivalent circuit of the resistance membrane tablet with four electrodes.
Figure 9:
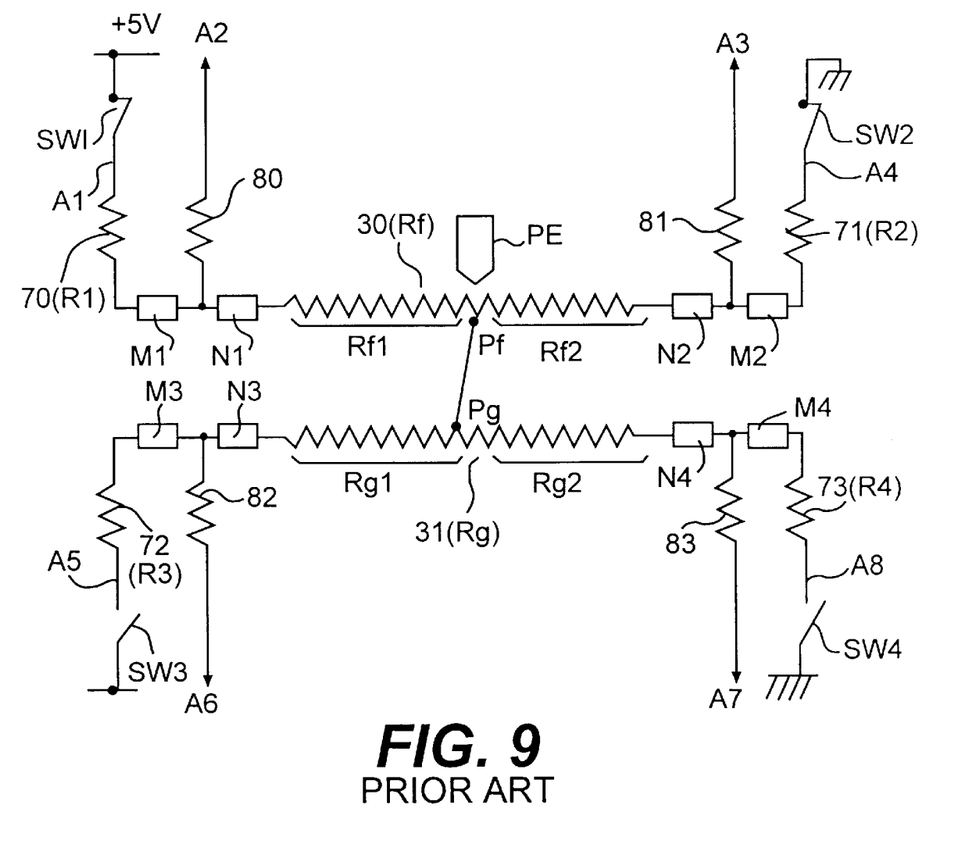
FIG. 9 shows an equivalent circuit of the resistance membrane tablet with eight electrodes.

The known coordinate input system has four electrodes or a eight electrodes. FIG. 6 shows a structure of a resistance membrane tablet having four electrodes. FIG. 7 shows a structure of resistance membrane tablet having eight electrodes. FIG. 8 shows an equivalent circuit of the resistance membrane tablet with four electrodes. FIG. 9 shows an equivalent circuit of the resistance membrane tablet with eight electrodes.

The resistance membrane tablet with four electrodes has an input side 10, four electrodes 11 (M1, M2, M3, M4), and four lines 12 (A1, A2, A3, A4). The resistance membrane tablet with eight electrodes has an input side 10, eight electrodes 21 (M1, M2, M3, M4, N1, N2, N3, N4), and eight lines 22 (A1, A2, A3, A4, A5, A6, A7, A8). The area of the electrode part of the tablet with eight electrodes is about 2 times the area of the electrode part of the tablet with four electrodes.

Next, an operation of detecting of coordinates is explained for the resistance membrane tablet with four electrodes. When the stylus pen PE contacts a point Pf on the input side 10, the film side resistance membrane 30 (Resistance value is Rf) contacts the glass side resistance membrane 31 (Resistance value is Rg). As a result a resistance division Rf1, Rf2, Rg1 and Rg2 occurs. Contact resistance 70 (R1) and 71 (R2) occur at the connection points with the line 12 (A1, A2) and a connector 44.

By closing switches SW1 and SW2, the circuit containing the resistance division 70 (R1) and 71 (R2) and the film side resistance membrane 30 (Rf) closes. Then it supplies a voltage V (+5 v) to each electrode M1 and M2 at both ends of the film side resistance membrane 30 (Rf) through the line A1 and A2. A value of electrical potential of the electrode M1 is established to 5 volts, and a value of electrical potential of the electrode M2 is established to 0 volt (ground). On the other hand, by opening switch SW3 and SW4, the circuit containing the resistance division 72 (R3) and 73 (R4) and the glass side resistance membrane 31 (Rg) opens. Then it doesn't supply the voltage to each electrode M3 and M4, at both ends of the glass side resistance membrane 31 (Rg).

In this condition, a potential drop of the resistance division Rf1 and Rf2 occurs at the film side resistance membrane 30. Then, a value of electric potential of a point Pf of the film side resistance membrane 30 becomes Vf. Equation (1) expresses the electric potential of the point Pf of the film side resistance membrane 30.

$$Vf=(Rf2+R1)/(Rf+R1+R2) \times V \quad (1)$$

$$Rf=Rf1+Rf2 \quad (2)$$

Because an electric current does not spread in the glass side resistance membrane 31, a potential drop of the resistance division Rg1 and Rg2 does not occur at the glass side resistance membrane 31. Accordingly, the value of the electrical potential detected by the electrode M3 or M4 of the glass side resistance membrane 31 is the same as the electric potential of the point Pf of the transparent film side resistance membrane 30. Both the electrical potential detected by the electrode M3 and the electrical potential detected by the electrode M4 have the same value, the value of the electrical potential of the point Pf of the film side resistance membrane 30. A signal of electrical potential of the point Pf of the film side resistance membrane 30 detected by the electrode M3 or M4 is taken out from the line A3 or A4 which was connected to each electrode (M3, M4)

Figure 2:
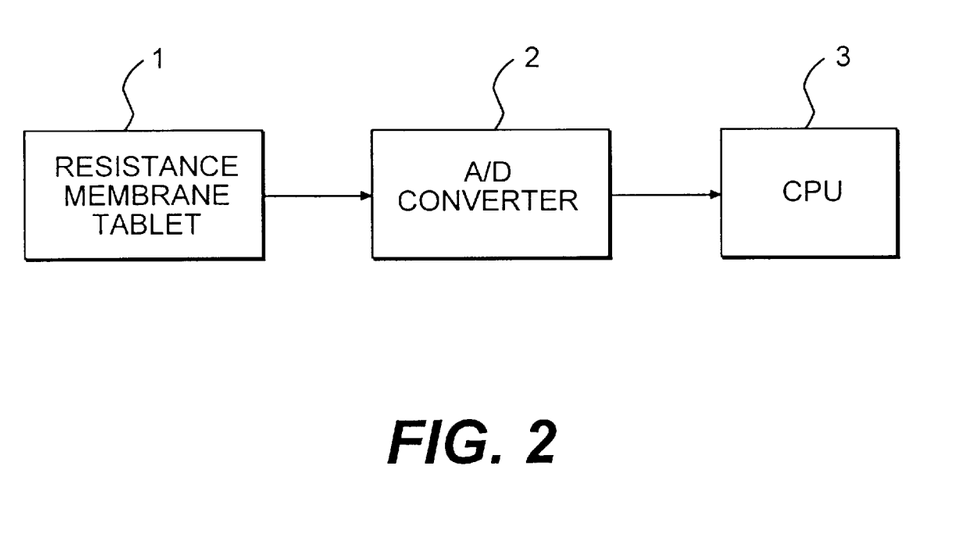
FIG. 2 shows the functional structure of the coordinate input system.

FIG. 2 shows a functional structure of the coordinate input system using a tablet. The lines A3 and A4 of the glass side resistance membrane 31 are connected to the A/D converter 2. The A/D converter 2 converts the electrical potential of the point Pf of the film side resistance membrane 30 which has analog quantities into a digital signal. A CPU3 calculates the X coordinate from the digital signal from the A/D converter 2.

For example, a position of the electrode M1 has a starting point of X coordinate (X=0), and a position of electrode M2 has a terminal of X coordinate (X=1024). The intervals from electrode M1 to electrode M2 are then divided into a value of 1024 dots. It is then assumed that a value of the resistance division 70 and a value of the resistance division 71 are 0 (R1=R2=0). In this case, when the stylus pen PE points at a position of the electrode M1 in order to point at a position of X=0 dots, electrical potential (Vf) of the point PE of the film side resistance membrane 30 becomes V volts. This electrical potential of the point PE of the film side resistance membrane 30 is detected by the electrode M3 or M4. An expression of electrical potential of a point PE is shown with the next expression.

$$Vf=(Rf+0)/(Rf+0+0) \times V = V \quad (3)$$

$$Rf2=Rf \quad (4)$$

The CPU3 calculates a value of X coordinate from the electrical potential of point PE of the film side resistance membrane 30. As a result CPU3 detects that X coordinate is X=0.

On the other hand, when the stylus pen PE points at a position of the electrode M2 in order to point at a position of X=1024 dots, electrical potential (Vf) of the point PE of the film side resistance membrane 30 becomes 0 volts. This electrical potential of the point PE of the film side resistance membrane 30 is detected by the electrode M3 or M4. In this case, the expression of electrical potential of a point PE is shown with the next expression.

$$Vf=(0+0)/(Rf+0+0)\times V=0 \qquad (5)$$

$$Rf2=0 \qquad (6)$$

The CPU3 calculates a value of the X coordinate from the electrical potential of point PE and detects that X coordinate as X=1024.

When the stylus pen PE points at an intermediate point of electrode M1 and electrode M2 in order to point at a position of X=512 dots, electrical potential (Vf) of the point PE of the film side resistance membrane 30 becomes ½V volts. This electrical potential of the point PE of the film side resistance membrane 30 is detected by the electrode M3 or M4. In this case, the expression of electrical potential of a point PE is shown with the next expression.

$$Vf=(\tfrac{1}{2}Rf+0)/(Rf+0+0)\times V=\tfrac{1}{2}V \qquad (7)$$

$$Rf2=\tfrac{1}{2}Rf \qquad (8)$$

The CPU3 calculates a value of X coordinate from the electrical potential of point PE and detects that X coordinate as X=512.

In case of detecting Y coordinate, by closing the switch SW3 and SW4, the circuit containing the resistance division 72 (R3) and 73 (R4) and the glass side resistance membrane 31 (Rg) closes. Then it supplies voltage V (+5v) to each electrode M3 and M4 at the ends of the glass side resistance membrane 31. By opening the switch SW1 and SW2, the circuit containing the resistance division 70 (R1) and 71 (R2), and the film side resistance membrane 30 (Rf) a opens. And a value of electrical potential of the electrode M3 is established to 5 volts, and a value of electrical potential of the electrode M4 is established to 0 volt (ground). In this condition, a resistance division Rg1 and Rg2 occurs at a point Pg of the glass side resistance membrane 31. The potential drop of the resistance division Rg1 and Rg2 occurs at the glass side resistance membrane 31, then a value of electric potential of the point Pg of the glass side resistance membrane 31 becomes Vg. An expression (9) shows an expression of the electric potential (Vg) of the point Pg of the glass side resistance membrane 31.

$$Vg=(Rg2+R3)/(Rg+R3+R4)\times V \qquad (9)$$

$$Rg=Rg1+Rg2 \qquad (10)$$

This electrical potential of the point Pg of the glass side resistance membrane 31 is detected by the electrode M1 or M2. A signal of electrical potential of the point Pg of the glass side resistance membrane 31 detected by the electrode M1 or M2 is taken out from the line A1 or A2 which was connected to each electrode (M1, M2)

Referring to FIG. 2, the lines A1 and A2 of the film side resistance membrane 30 are connected with an A/D converter 2. The A/D converters 2 convert the analogs electric potential of the point Pg of the glass side resistance membrane 31, into a digital signal corresponding to the Y coordinate. The CPU3 calculates the Y coordinate from the digital signal from the A/D converter 2. For example, a position of electrode M3 has a starting point of Y coordinate (Y=0) and electrode M4 has a terminal of Y coordinate (Y=1024). The intervals from electrode M3 to electrode M4 into a value of 1024 dots.

The basic operation of coordinate detection resistance membrane tablet with four electrodes is the same as mentioned above. But actually, it is needed to consider the resistance division 70 (R1) and 71 (R2) of the film side resistance membrane 30 when detecting an X coordinate, and it is needed to consider the resistance division 72 (R3) and 73 (R4) of the glass side resistance membrane 31 when detecting a Y coordinate. In addition, the value of each resistance division (70,71,72,72) changes according to the temperature change and a change of contact state of between each line (A1,A2,A3,A4) and the connector 44.

For example, a potential drop of 0.5 volts occurs by the contact resistance 70 of the line A1 connected to the electrode M1, and a potential drop of 0.5 volts occurred by the contact resistance 71 of the line A2 connected to the electrode M2. In this state, the value of electrical potential of the electrode M1 is 4.5 volts, and the value of electrical potential of the electrode M2 is 0.5 volts. Accordingly a difference of electrical potential between the electrode M1 and the electrode M2 becomes 4.0 volts. In this case, when electrical current potential Vf=4.5 volts was detected, the CPU3 needs to calculate the X coordinate as X=0. When an electrical current potential Vf=0.5 volts was detected, the CPU3 needs to calculate the X coordinate as X=1024. And by range of difference 4.0 volts of electrical potential with the electrode M1 and the electrode M2, the CPU3 needs to assign a range of X coordinates of 1024 dots.

The next expression (11 shows the difference in electrical potential of the electrodes M1 and M2.

$$Vfv=Rf/(Rf+R1+R2)\times V \qquad (11)$$

The next time, each contact resistance of lines A1 and A2 changes, as a result a potential drop of 0.7 volts occurs by the contact resistance 70 and a potential drop of 0.8 volts occurs by the contact resistance 71. By this state, a value of electrical potential of the electrode M1 is 4.3 volts, and a value of electrical potential of the electrode M2 is 0.8 volts. Accordingly a difference of electrical potential between the electrode M1 and the electrode M2 becomes 3.5 volts. In this case, when an electrical potential Vf=4.3 volts was detected, the CPU3 needs to calculate the X coordinate as X=0. When an electrical current potential Vf=0.7 volts was detected, the CPU3 needs to calculate the X coordinate as X=1024. Using the difference of 3.5 volts between the electrode M1 and the electrode M2, the CPU3 assigns a range of X coordinates of 1024 dots.

For the detection of Y coordinates, the CPU3 needs to consider the contact resistance of the electrode M3 and the electrode M4. The CPU3 needs to calculate an X coordinate with X=1024. Using the difference of electrical potential between electrodes M3 and M4, the CPU3 assigns a range of X coordinate of 1024 dots. Accordingly, before detecting an X coordinate and a Y coordinate, the CPU3 detects the value of electrical potential of each electrode as having given the voltage V.

However, in case of the coordinate input system of resistance membrane tablet of four electrodes, the value of electrical potential of each electrode (M1, M2, M3, M4) is taken out from each line (A1, A2, A3, A4) connected to each electrode and having the contact resistance (R1, R2, R3, R4). Accordingly, it can't detect the electrical potential of each electrode precisely because it can't detect the potential drop of each line with this hardware. The coordinate input system with a resistance membrane tablet of four electrodes must detect each potential drop of each line with software.

Next, a coordinate detection operation is explained for the coordinate inputting system with resistance membrane tablet of eight electrodes. FIG. 7 shows a structure of a resistance membrane tablet of the coordinate inputting system with a resistance membrane tablet of eight electrodes. The resistance membrane tablet with eight electrodes detects the potential drop of each line with hardware. Accordingly, it can detect the electrical potential of each electrode with hardware precisely.

FIG. 9 shows an equivalent circuit of the resistance membrane tablet with eight electrodes. The film side resistance membrane 30 includes, in addition to the electrodes M1 and M2 for the voltage V supply, electrodes N1 and N2 for electrical potential detection. The glass side resistance membrane 31 includes, in addition to the electrode M3 and M4 for the voltage V supply, electrodes N3 and N4 for electrical potential detection.

Next, a coordinate detection operation is explained for the coordinate inputting system using a resistance membrane tablet with eight electrodes. When it detects the X coordinate, the switches SW1 and SW2 are closed. In this condition, the circuit containing the resistance division 70 (R1) and 71 (R2) and the film side resistance membrane 30 (Rf) is closed. Then it supplies a voltage V to each electrode M1 and M2 at the ends of the film side resistance membrane 30 (Rf) through lines A1 and A4. When the stylus pen PE comes contacts the point Pf of the film side resistance membrane 30, the electrical potential of the point Pf is detected by the electrodes N3 and N4. Both electrical potentials detected by the electrodes N3 and N4 are equal. The electrical potential detected with electrode N3 or N4 is taken out from a line A6 or A7, and is output to the A/D converter 2.

When it detects the Y coordinate, the switches SW3 and SW4 are closed. In this condition, the circuit containing the resistance division 72 (R3) and 73 (R4), and the glass side resistance membrane 31 (Rg) is closed. Then it supplies a voltage V to each electrode M3 and M4 at the ends of the glass side resistance membrane 31 (Rg) through lines A5 and A8. When the stylus pen PE contacts the point Rf of the film side resistance membrane 30, the electrical potential of the point Pg is detected by the electrodes N1 and N2. Both electrical potentials detected by the electrodes N1 and N2 are equal. The electrical potential detected with the electrode N1 or N2 is taken out from a line A2 or A3, and is output to the A/D converter 2.

Next, an operation to detect an initial value of the electrical potential of each electrode (M1, M2, M3, M4) with a hardware is explained. When it detects, the electrical potentials of the electrodes N1 and the electrode N2, the switches SW1 and SW2 are closed, and it supplies a voltage V to each electrode M1 and M2 through lines A1 and A4. The electrical potential of the electrode N1 is detected on the line A2. The electrical potential on the electrode N2 is detected on the line A3. The electric current does not flow in the line A2 and the line A3. Accordingly, because the voltage drop from contact resistance 80 and contact resistance 81 does not occur, the electrical potential on each line A2 and A3 is almost the same as the electrical potential of each electrode N1 and N2. When it detects the electrical potential of the electrodes N3 and N4, the switches SW3 and SW4 are closed, and a voltage V appears at each electrode M3 and M4. The electrical potential of the electrode N3 is detected on the line A6. The electrical potential of the electrode N4 is detected on the line A7. The electric current does not flow in the lines A6 and A7. Accordingly, because the voltage drop from contact resistance 82 and contact resistance 83 does not occur, the electrical potential on each line A6 and A7 is almost the same as the electrical potential of each electrode N3 and N4.

In this way, the resistance membrane with eight electrodes detects each potential drop of each line with hardware. But the area of the electrode part of the tablet with eight electrodes is about 2 times the area of the electrode part of the tablet with four electrodes. The coordinate input system with four electrodes can not detect each potential drop of each line with hardware. Accordingly, when the voltage drop of a line changes because of change of contact resistance, it can not detect accurately the voltage drop with hardware. The CPU2 then can not calculate the value of the X and Y coordinates precisely.

SUMMARY OF THE INVENTION

Accordingly, it is an object of the present invention to provide an improved coordinate input system. An improved tablet detects an initial value of electrical potential of each electrode with hardware with only four electrode.

In accordance with the present invention, the foregoing objects, among others, are achieved by providing a coordinate input system uses a tablet comprising a film side resistance membrane to detect the X coordinate, a glass side resistance membrane to detect the Y coordinate, a pair of film side electrodes on the film side resistance membrane, a pair of glass side electrodes on the glass side resistance membrane, a pair of film side lines connected to the pair of film side electrodes as one line and then diverged into two lines, and a pair of glass side lines connected to the pair of glass side electrodes as one line and then diverged into two lines.

There has also been provided, in accordance with yet another aspect of the present invention, a coordinate input system which using a tablet comprising a film side resistance membrane to detect the X coordinate, a glass side resistance membrane to detect the Y coordinate, a pair of film side electrodes on the film side resistance membrane, a pair of glass side electrodes on the glass side resistance membrane, a pair of film side lines connected to the pair of film side electrodes, and a pair of glass side lines, which are connected to each the pair of glass side electrodes, and a connector connecting the pair of film side lines to the pair of glass side lines at two points.

There has also been provided, in accordance with yet another aspect of the present invention, a coordinate input system using tablet comprising a film side resistance membrane to detect the X coordinate, a glass side resistance membrane to detect the Y coordinate, a pair of film side electrodes on said glass side resistance membrane to detect the electrical potential corresponding to the Y coordinate of a point pointed at by a stylus pen, a pair of glass side electrodes on said film side resistance membrane to detect the electrical potential corresponding to the X coordinate of the point, and a pair of film side lines connected to the pair of film side electrodes as one line then and diverged into one line to give the voltage and one line to take out a signal of electrical potential detected by the pair of film side electrodes, a pair of glass side lines connected to the pair of glass side electrodes as one line and then diverged into one line to give the voltage and one line to take out a signal of electrical potential detected with the pair of glass side electrodes, means for supplying a voltage to the pair of film side electrodes and the pair of glass side electrodes, an A/D converter for converting a signal of electrical potential detected with the pair of film side electrodes and the pair of glass side electrodes into a digital signal, and a CPU for calculating the X coordinate from the digital signal detected by the pair of glass side electrodes, and for calculating the Y coordinate from the digital signal detected by the pair of film side electrodes.

DETAILED DESCRIPTION OF THE PREFERRED EMBODIMENTS

Figure 1:
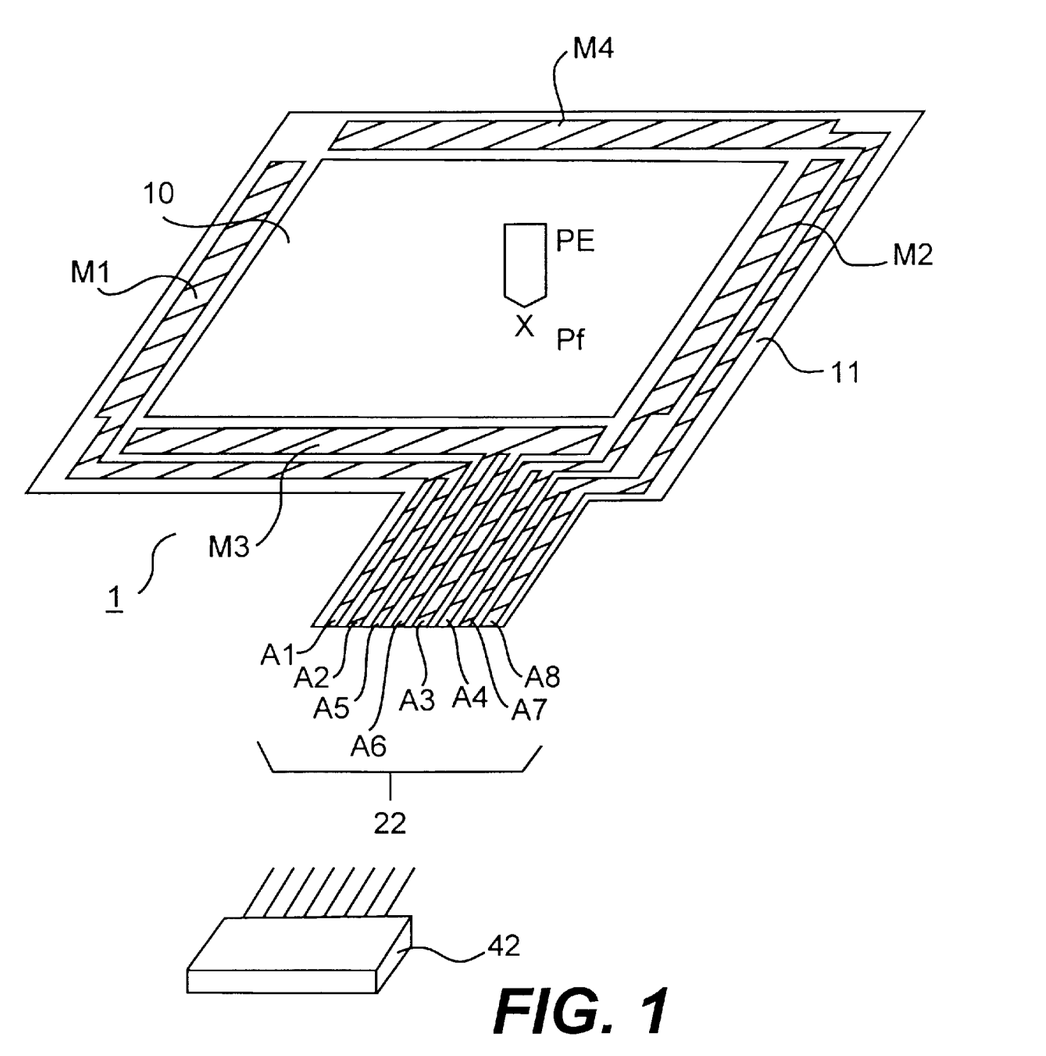
FIG. 1 shows a first embodiment of the resistance membrane tablet of the coordinate input system according to this invention.

A resistance membrane tablet 1 of this invention shown in FIG. 1 comprises an input side 10, four electrodes 11 (M1, M2, M3, M4), and eight lines 22 (A1, A2, A3, A4, A5, A6, A7, A8). The electrodes M1 and M2 detect the Y coordinate. The electrodes M1 and M2 are on opposite sides of a film side resistance membrane 30. The electrodes M3 and M4 detect the X coordinate. The electrodes M3 and M4 are on opposite sides of a glass side resistance membrane 31. Each electrode 11 (M1, M2, M3, M4) has the same function as the electrodes of the coordinate input system with four electrodes. The four lines 22 (A2, A3, A6, A7) reflect the electrical potential on the each electrodes 11. A connector 42 connects these four lines to an A/D converter 2. The four lines (A1, A4, A5, A8) supply a voltage to the electrodes 11. Before connecting with connector 42, the lines 22 diverge into eight lines, and those eight lines are connected to connector 42.

When the stylus pen PE contacts the film side resistance membrane 30, the electrode M1 or M2 detects an electrical potential of a point Pg on the glass side resistance membrane 31 corresponding to the Y coordinate. The electrode M3 or M4 detects an electrical potential of a point Pf on the film side resistance membrane 30 corresponding to the X coordinate. The electrical potential, corresponding to the X coordinate, on the electrode M1 or M2 is converted into a digital signal by an A/D converter 2. The electrical potential, corresponding to the Y coordinate, on the electrode M3 or M4 is also converted into digital signal by the A/D converter 2. The CPU 3 calculates the X coordinate from the digital signal corresponding to the X coordinate. The CPU 3 also calculates the Y coordinate from the digital signal corresponding to the Y coordinate. Each connection between connector 42 and lines (A1, A2, A3, A4) creates a contact resistance (70, 90, 91, 71). Each connection between connector 42 and lines (A5, A6, A7, A8) also creates a contact resistance (72, 92, 93, 73).

The line A1 connects to the line A2 at a point P1. A single line then connects the lines A1 and A2 to the electrode M1 of the film side resistance membrane 30. The line A1 delivers a voltage V (+5V) to film side resistance membrane 30 and the electrode M1. The line A2 detects the electrical potential Vg of a point Pg of the glass side resistance membrane 31 when the Y coordinate is detected. The line A2 also detects the electrical potential of the electrode M1 when the stylus pen PE is not applied. The line A2 thus detects the voltage drop caused by contact resistance 70 (R1) of line A1. The line A3 connects to the line A4 at a point P2. A single line then connects the line A3 and the line A4 to the electrode M2 of the film side resistance membrane 30. The line A4 delivers voltage V (ground) to the film side resistance membrane 30 and the electrode M2. The line A3 detects the electrical potential Vg of the point Pg of the glass side resistance membrane 31 when the Y coordinate is detected. The line A3 also detects the electrical potential of the electrode M2 when the stylus pen PE is not applied. The line A3 thus detects the voltage drop caused by contact resistance 71 (R2) of line A4.

The line A5 connects to the line A6 at a point P3. A single line then connects the line A5 and the line A6 to the electrode M3 of the grass side resistance membrane 31. The line A5 delivers a voltage V (+5V) to the glass side resistance membrane 31 and the electrode M3. The line A6 detects the electrical potential Vf of a point Pf of the film side resistance membrane 30 when the X coordinate is detected. The line A6 also detects electrical potential of the electrode M3 when the stylus pen PE is not applied. The line A6 thus detects the voltage drop by the contact resistance 72 (R3) of line A5. The line A7 connects to the line A8 at a point P4. A single line then connects the line A7 and the line A8 to the electrode M4 of the glass side resistance membrane 31. The line A8 delivers a voltage V (ground) to the glass side resistance membrane 31 and the electrode M4. The line A7 detects the electrical potential Vf of the point Pf of the film side resistance membrane 30 when the X coordinate is detected. The line A7 also detects the electrical potential of the electrode M4 when the stylus pen PE is not applied. Thus, the line A7 detects the voltage drop by contact resistance 73 of line A8 (R4).

Figure 3:
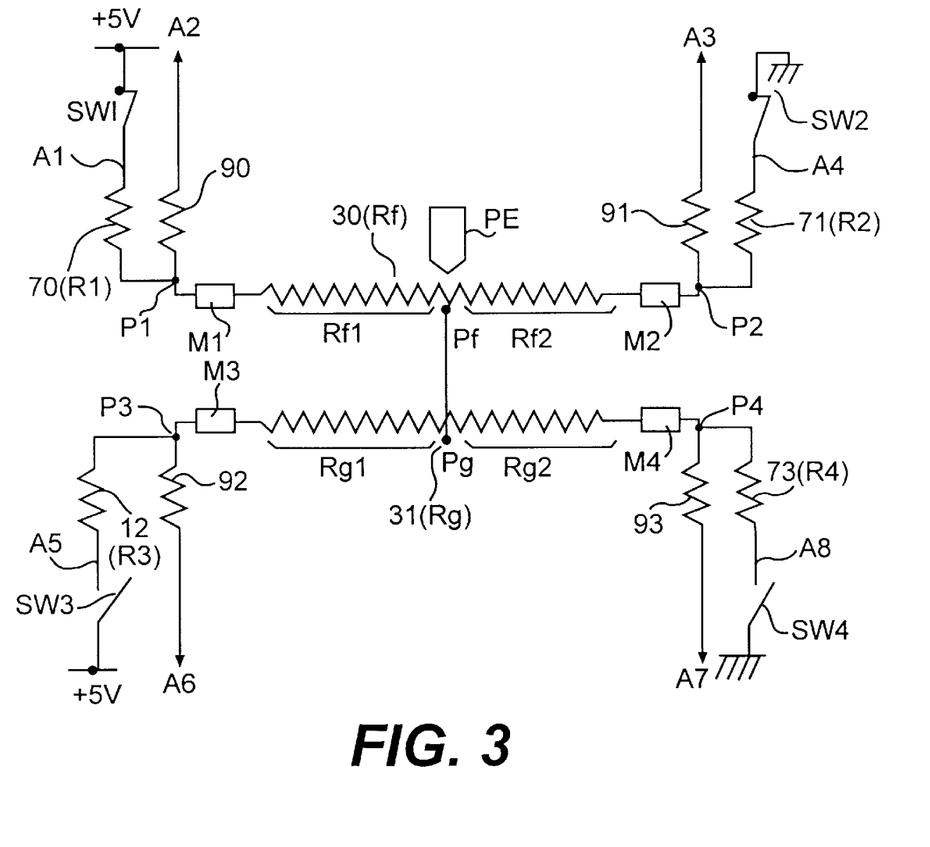
FIG. 3 shows an equivalent circuit of a resistance tablet of the coordinate input system according to this invention.

Now, an operation to detect the X coordinate and the Y coordinate is explained. The detection is similar to the detection in the resistance membrane tablet of four electrodes.

When the stylus pen PE contacts the point Pf of the film side resistance membrane 30, the film side resistance membrane 30 contacts the glass side resistance membrane 31. As a result, a resistance division Rf1 and Rf2 is generated in the film resistance membrane side 30, and a resistance division Rg1 and Rg2 is generated in the glass side resistance membrane 31.

First, the detection of the X coordinate is explained. By closing a switches SW1 and SW2, the circuit containing the contact resistance 70 (R1) and 71 (R2), and the resistance division Rf1 and Rf2 closes. Then the voltage V (5 volts) is delivered to the film side resistance membrane 30 from the electrode M1 and the electrode M2 through lines A1 and A4.

The circuit containing the contact resistance 72 (R3) and 73 (R4), and the resistance division Rg1 and Rg2 opens. Then the voltage V (5 volts) is not delivered to the glass side resistance membrane 31. If the circuit of the film side resistance membrane 30 closes, a voltage drop occurs because of the resistance division Rf1 and Rf2. As a result, the electrical potential at the point Pf of the film side resistance membrane 30 becomes Vf. This electrical potential Vf corresponds to the X coordinate as shown in expression (1). This electrical potential Vf of the point Pf of the film side resistance membrane 30 is detected by the electrode M3 or M4. The signal of the electrical potential Vf of the point Pf is taken out by the line A6 and A7 of the glass side resistance membrane 31. The A/D converter 2 converts the electrical potential into a digital signal corresponding to the X coordinate.

Next, the operation of detection of the Y coordinate is explained. By closing the switches SW1 and SW2, the circuit containing the contact resistance 72 (R3) and 73 (R4), and the resistance division Rg1 and Rg2 closes. Then, the voltage V (5 volts) is delivered to the glass side resistance membrane 31 from the electrode M3 and the electrode M4 through lines A5 and A8. The circuit containing the contact resistance 70 (R1) and 71 (R2), and the resistance division Rf1 and Rf2 opens. Thus, the voltage V (5 volts) is not delivered to the film side resistance membrane 30. If the circuit of the glass side resistance membrane 31 closes, a voltage drop occurs because of the resistance division Rg1 and Rg2. As a result, the electrical potential of the point Pg of the glass side resistance membrane 31 becomes the electrical potential Vg. This electrical potential Vg of the point Pg of the glass side resistance membrane 31 is detected by the electrode M1 or M2. A signal of the electrical potential Vg is taken out by line A2 or A3 of the film side resistance membrane 30. The A/D converter 2 converts this electrical potential into a digital signal corresponding to the Y coordinate.

Next, an operation to detect an initial value of electrical potential of each electrode with the hardware of this embodiment will be explained. The operation of detecting the initial value of electrical potential of each electrode is similar to the operation of the coordinate input system with eight electrodes. First, an operation to detect an initial value of the electrical potential of the electrodes M1 and M2 of the film side resistance membrane 30 is explained. When the stylus pen PE does not contact the film side resistance membrane 30, a voltage V (5 volts) appears on each electrode M1 and M2 from lines A1 and A4. The initial value of the electrical potential of the electrodes M1 and M2 is then detected. The initial value of the electrical potential on the electrodes M1 is detected, and the initial value of electrical potential of the electrode M1 is reflected on the line A2. The initial value of the electrical potential on the electrode M2 is also detected, and the initial electrical potential on the electrode M2 is reflected on the line A3. The lines A2 and A3 have contact resistance 90 and 91. Because an electric current does not flow in the lines A2 and A3, a voltage drop across contact resistance 90 and 91 does not occur. Accordingly, the contact resistance 90 and 91 can be ignored. On this account, each line A2 and A3 reflects the precise value of the electrical potential of the electrodes M1 and M2. For example, the position of the electrode M1 is the starting point of the X coordinate, and the position of the electrode M2 is a terminal of the X coordinate. The intervals from electrodes M1 to M2 are divided into a values of 1024 dots. The initial value of the electrical potential on the electrode M1 is detected as the electrical potential of the point Pf when the stylus pen PE points to a position X=0 dots. The initial value of the electrical potential of the electrode M2 is detected as the electrical potential of the point Pf when the stylus pen PE points to a position X=1024 dots.

Next, An operation to detect an initial value of the electrical potential of the electrodes M3 and M4 of the glass side resistance membrane 31 is explained. If the stylus pen PE does not contact the film side resistance membrane 30, the voltage V (5 volts) appears on the glass side resistance membrane 31 from electrodes M3 and M4 through lines A5 and A8. The initial value of the electrical potential of the electrodes M3 and M4 is then detected. The initial value of the electrical potential of the electrode M3 is detected, and the initial value of the electrical potential of the electrode M3 is reflected on the line A6. The initial value of the electrical potential of the electrode M4 is also detected, and the initial value of the electrical potential of the electrode M4 is reflected on the line A7. The lines A6 and A7 have the contact resistance 92 and 93. Because an electric current does not flow in each line the A6 and A7, a voltage drop across the contact resistance 92 and 93 does not occur. Accordingly, the contact resistance 92 and 93 can be ignored. On this account, each line A6 and A7 reflects the precise value of the initial electrical potential of each electrodes M3 and M4. For example, a position of the electrode M3 is the starting point of the Y coordinate, and a position of the electrode M4 is a terminal of the Y coordinate. The interval from electrode M3 to electrode M4 into a value of 1024 dots. The initial value of the electrical potential of the electrode M3 is detected as the electrical potential of the point Pg when the stylus pen PE points to a position Y=0 dots. The initial value of the electrical potential of the electrode M4 which detected it is established as electrical potential of the point Pg when the stylus pen PE points to a position Y=1024 dots. According to above operation, an initial value of electrical potential influenced by the contact resistance of each electrode is detected with hardware.

Figure 4:
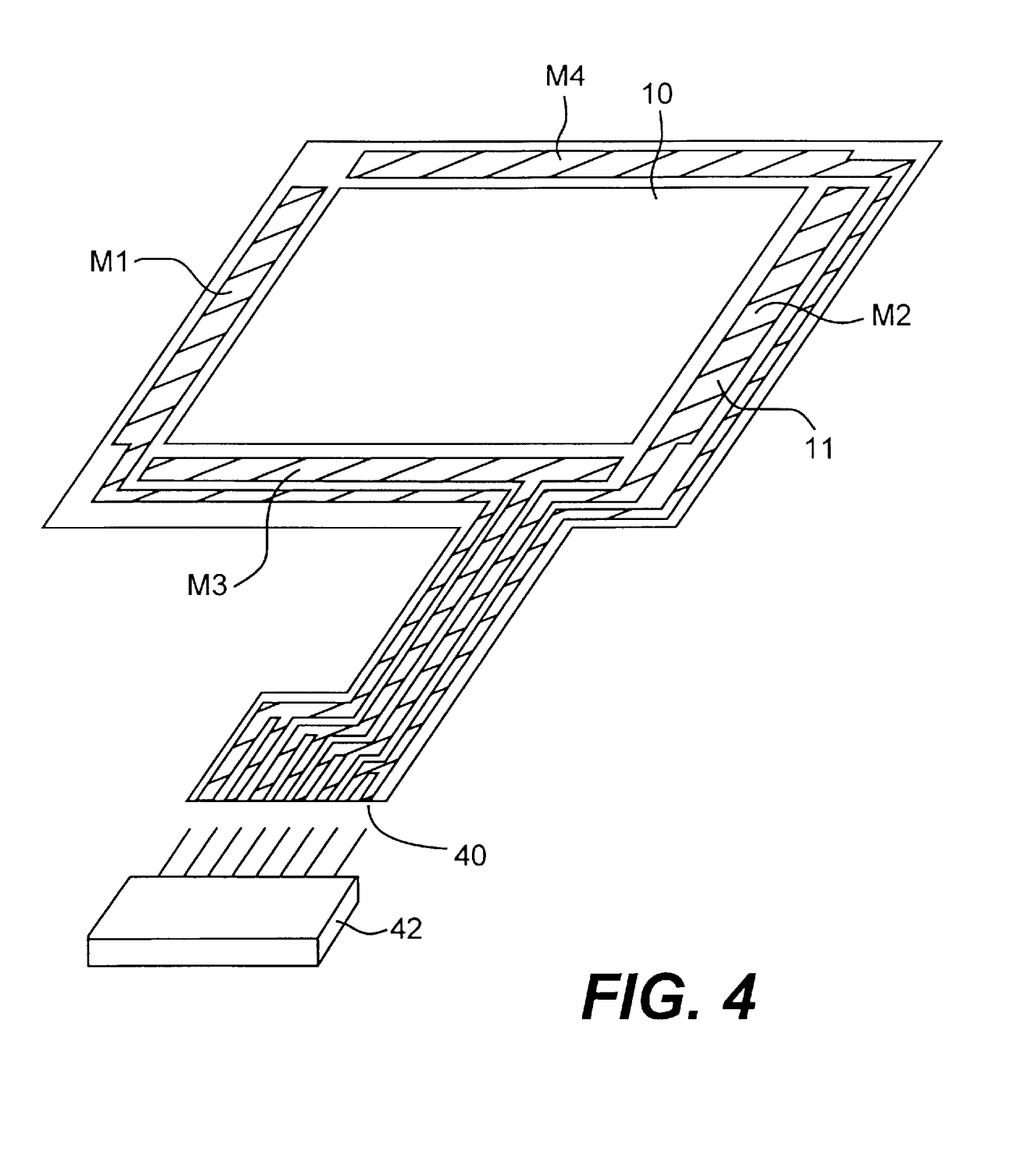
FIG. 4 shows a second embodiment of a resistance membrane tablet of the coordinate input system according to this invention.

FIG. 4 shows a second embodiment of a resistance membrane tablet for a coordinate input system. In The resistance membrane tablet shown in FIG. 4, the shape of lines 22 is modified. Lines 22 connect to electrodes 11 and diverge at a position near the connector 40.

Figure 5:
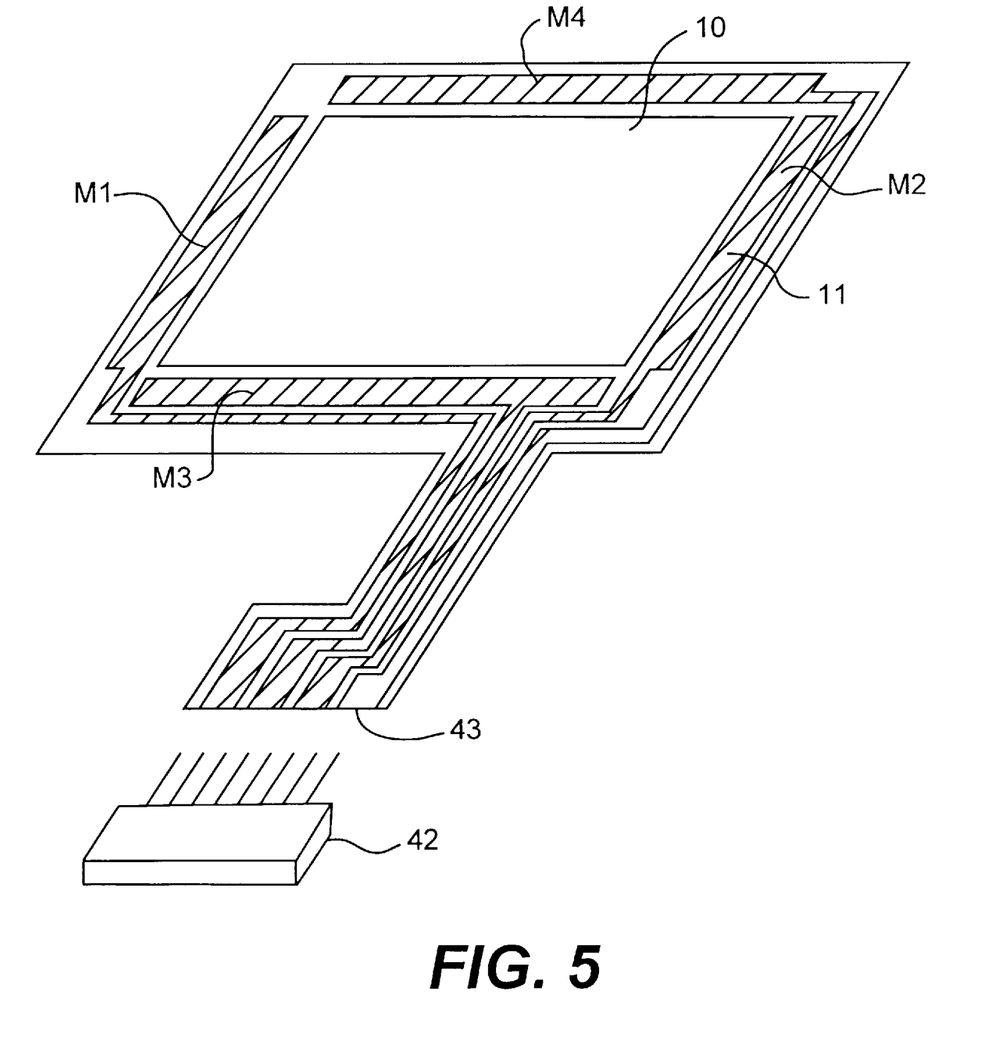
FIG. 5 shows a third embodiment of a resistance membrane tablet of the coordinate input system according to this invention.

FIG. 5 shows a third embodiment of a resistance membrane tablet for a coordinate input system. In the resistance membrane tablet shown in FIG. 5, the shape of lines 43 is modified. The line width of lines 43 increases at the connector 42. Thus, two terminals of the connector 42 (a terminal to detect electrical potential and a terminal to supply the voltage) connected to one line.

What is claimed is:

1. A coordinate input system, comprising:
   a stylus pen;
   a film side resistance membrane to detect an X coordinate;
   a glass side resistance membrane to detect a Y coordinate the glass side resistance membrane overlying the film side resistance membrane;
   a pair of film side electrodes on said film side resistance membrane for detecting an electrical potential corresponding to the Y coordinate of a point indicated by said stylus pen;

a pair of glass side electrodes on said glass side resistance membrane for detecting an electrical potential corresponding to the X coordinate of the point indicated by said stylus pen;

a pair of film side lines each connected to one of said pair of film side electrodes at one point and there after diverging into one line to supply a voltage and one line to monitor the electrical potential said pair of film side electrodes;

a pair of glass side lines each connected to one of said pair of glass side electrodes at one point and there after diverging into one of line to supply a voltage and one line to monitor electrical potential of said pair of glass side electrodes;

an A/D converter for converting electrical potentials on said pair of film side electrodes and said pair of glass side electrodes into digital signals; and a CPU connected to said A/D converter for calculating the X coordinate from a digital signal of the electrical potential on said pair of glass side electrodes, and for calculating the Y coordinate from a digital signal of the electrical potential on said pair of film side electrodes.

* * * * *